(12) United States Patent
Laws et al.

(10) Patent No.: US 8,508,590 B2
(45) Date of Patent: Aug. 13, 2013

(54) METHOD AND APPARATUS FOR SIMULATING A PHYSICAL ENVIRONMENT TO FACILITATE VEHICLE OPERATION AND TASK COMPLETION

(75) Inventors: Matthew Edwin Laws, Auckland (NZ); Christopher W. Goode, Auckland (NZ); Toby Hartnoll Joshua Collett, London (GB); Andrew Evan Graham, Waitakere (NZ)

(73) Assignee: Crown Equipment Limited, Auckland (NZ)

( * ) Notice: Subject to any disclaimer, the term of this patent is extended or adjusted under 35 U.S.C. 154(b) by 461 days.

(21) Appl. No.: 12/660,616

(22) Filed: Mar. 2, 2010

(65) Prior Publication Data

US 2011/0216185 A1   Sep. 8, 2011

(51) Int. Cl.
*G09B 9/00* (2006.01)
*H04N 7/00* (2011.01)

(52) U.S. Cl.
USPC .............. 348/121; 348/114; 348/119

(58) Field of Classification Search
None
See application file for complete search history.

(56) References Cited

U.S. PATENT DOCUMENTS

| | | | |
|---|---|---|---|
| 4,043,418 A | 8/1977 | Blakeslee | |
| 4,782,920 A | 11/1988 | Gaibler et al. | |
| 4,858,132 A | 8/1989 | Holmquist | |
| 5,170,352 A | 12/1992 | McTamaney et al. | |
| 5,202,832 A | 4/1993 | Lisy | |
| 5,208,753 A | 5/1993 | Acuff | |
| 5,471,393 A | 11/1995 | Bolger | |
| 5,539,638 A | 7/1996 | Keeler et al. | |
| 5,612,883 A | 3/1997 | Shaffer et al. | |
| 5,646,845 A | 7/1997 | Gudat et al. | |
| 5,682,317 A | 10/1997 | Keeler et al. | |
| 5,916,285 A | 6/1999 | Alofs et al. | |
| 5,961,571 A | 10/1999 | Gorr et al. | |
| 6,012,003 A | 1/2000 | Astrom | |
| 6,092,010 A | 7/2000 | Alofs et al. | |

(Continued)

FOREIGN PATENT DOCUMENTS

| | | |
|---|---|---|
| DE | 19757333 C1 | 9/1999 |
| DE | 10220936 A1 | 12/2003 |

(Continued)

OTHER PUBLICATIONS

Erico Guizzo, Three Engineer Hundreds of Robots One warehouse, Jul. 2008, Spectrum IEEE, vol. 45 Issue 7, pp. 26-34.*

(Continued)

*Primary Examiner* — Joseph Ustaris
*Assistant Examiner* — Zhubing Ren
(74) *Attorney, Agent, or Firm* — Dinsmore & Shohl LLP

(57) ABSTRACT

A method and apparatus for simulating a physical environment to facilitate vehicle operation and task completion is described. In one embodiment, the method includes processing data that is transmitted from a sensor array comprising a plurality of devices, wherein the plurality of devices are placed throughout a physical environment that comprises a plurality of objects, accessing model information associated with the plurality of objects, wherein the model information indicates at least one physical attribute associated with each of the plurality of objects, correlating the model information with the transmitted data from the sensor array to produce a correlation result, generating at least one visual representation of the physical environment from at least one viewpoint based on the correlation result and identifying at least one obstruction, within the physical environment, using the at least one visual representation.

18 Claims, 10 Drawing Sheets

(56) References Cited

U.S. PATENT DOCUMENTS

| | | | |
|---|---|---|---|
| 6,208,916 B1 | 3/2001 | Hori | |
| 6,246,930 B1 | 6/2001 | Hori | |
| 6,308,118 B1 | 10/2001 | Holmquist | |
| 6,325,749 B1 | 12/2001 | Inokuchi et al. | |
| 6,539,294 B1 | 3/2003 | Kageyama | |
| 6,641,355 B1 | 11/2003 | McInerney et al. | |
| 6,816,085 B1 * | 11/2004 | Haynes et al. | 340/932.2 |
| 6,952,488 B2 | 10/2005 | Kelly et al. | |
| 7,147,147 B1 * | 12/2006 | Enright et al. | 235/379 |
| 7,148,458 B2 | 12/2006 | Schell et al. | |
| 7,162,338 B2 | 1/2007 | Goncalves et al. | |
| 7,177,737 B2 | 2/2007 | Karlsson et al. | |
| 7,272,467 B2 | 9/2007 | Goncalves et al. | |
| 7,539,563 B2 | 5/2009 | Yang et al. | |
| 7,646,336 B2 | 1/2010 | Tan et al. | |
| 7,679,532 B2 | 3/2010 | Karlsson et al. | |
| 7,688,225 B1 * | 3/2010 | Haynes et al. | 340/932.2 |
| 7,689,321 B2 | 3/2010 | Karlsson | |
| 7,720,554 B2 | 5/2010 | DiBernardo et al. | |
| 7,734,385 B2 | 6/2010 | Yang et al. | |
| 7,844,364 B2 | 11/2010 | McLurkin et al. | |
| 7,996,097 B2 | 8/2011 | DiBernardo et al. | |
| 8,020,657 B2 | 9/2011 | Allard et al. | |
| 8,050,863 B2 | 11/2011 | Trepagnier et al. | |
| 8,103,383 B2 | 1/2012 | Nakamura | |
| 8,126,642 B2 | 2/2012 | Trepagnier et al. | |
| 8,150,650 B2 | 4/2012 | Goncalves et al. | |
| 8,204,679 B2 | 6/2012 | Nakamura | |
| 8,255,107 B2 | 8/2012 | Yang et al. | |
| 8,280,623 B2 | 10/2012 | Trepagnier et al. | |
| 2004/0030493 A1 | 2/2004 | Pechatnikov et al. | |
| 2004/0202351 A1 | 10/2004 | Park et al. | |
| 2004/0249504 A1 | 12/2004 | Gutmann et al. | |
| 2005/0149256 A1 | 7/2005 | Lawitzky et al. | |
| 2005/0182518 A1 | 8/2005 | Karlsson | |
| 2005/0234679 A1 * | 10/2005 | Karlsson | 702/181 |
| 2005/0244259 A1 | 11/2005 | Chilson et al. | |
| 2006/0181391 A1 * | 8/2006 | McNeill et al. | 340/5.61 |
| 2006/0184013 A1 | 8/2006 | Emanuel et al. | |
| 2007/0061043 A1 | 3/2007 | Ermakov et al. | |
| 2007/0090973 A1 | 4/2007 | Karlsson et al. | |
| 2007/0106465 A1 | 5/2007 | Adam et al. | |
| 2007/0150097 A1 | 6/2007 | Chae et al. | |
| 2007/0153802 A1 | 7/2007 | Anke et al. | |
| 2007/0262884 A1 | 11/2007 | Goncalves et al. | |
| 2008/0272193 A1 | 11/2008 | Silverbrook et al. | |
| 2009/0140887 A1 | 6/2009 | Breed et al. | |
| 2009/0216438 A1 | 8/2009 | Shafer | |
| 2010/0161224 A1 | 6/2010 | Lee et al. | |
| 2010/0222925 A1 | 9/2010 | Anezaki | |
| 2010/0256908 A1 | 10/2010 | Shimshoni et al. | |
| 2010/0268697 A1 | 10/2010 | Karlsson et al. | |
| 2011/0010023 A1 | 1/2011 | Kunzig et al. | |
| 2011/0121068 A1 | 5/2011 | Emanuel et al. | |
| 2011/0125323 A1 | 5/2011 | Gutmann et al. | |
| 2011/0150348 A1 | 6/2011 | Anderson | |
| 2011/0230207 A1 | 9/2011 | Hasegawa | |
| 2012/0035797 A1 | 2/2012 | Oobayashi et al. | |
| 2012/0101784 A1 | 4/2012 | Lindores et al. | |
| 2012/0191272 A1 | 7/2012 | Andersen et al. | |
| 2012/0323431 A1 | 12/2012 | Wong et al. | |
| 2013/0006420 A1 | 1/2013 | Karlsson et al. | |

FOREIGN PATENT DOCUMENTS

| | | |
|---|---|---|
| DE | 10234730 A1 | 2/2004 |
| DE | 102007021693 A1 | 11/2008 |
| EP | 1 201 536 A2 | 5/2002 |
| EP | 1732247 A1 | 12/2006 |
| EP | 1 995 206 A1 | 11/2008 |
| GB | 2389947 A | 12/2003 |
| JP | 52-066260 | 1/1977 |
| JP | 60067818 A | 4/1985 |
| JP | 2000-255716 A | 9/2000 |
| JP | 2002048579 A | 2/2002 |
| JP | 2002108446 A | 4/2002 |
| JP | 2005114546 | 4/2005 |
| JP | 2008-009818 A | 1/2008 |
| KR | 10-0814456 B1 | 3/2008 |
| WO | 03096052 A2 | 11/2003 |

OTHER PUBLICATIONS

Written Opinion of the International Searching Authority, mailed Nov. 30, 2011 for PCT Application No. PCT/NZ2011/000025.

Borenstein et al. "Mobile Robot Positioning—Sensors and Techniques", Journal of Robotic Systems, Special Issue on Mobile Robots, vol. 14, No. 4, pp. 231-249, Apr. 1997.

Harmon et al., "A Technique for Coordinating Autonomous Robots", Autonomous Systems Branch Naval Ocean Systems Center San Diego, CA 92152, 1986.

Jansfelt et al., "Laser Based Position Acquisition and Tracking in an Indoor Environment", Proc. Int. Symp. Robotics and Automation, 1998.

Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.

Office Action pertaining to U.S. Appl. No. 13/159,500, dated Mar. 26, 2013.

Office Action pertaining to U.S. Appl. No. 13/219,271, dated Feb. 25, 2013.

Office Action pertaining to U.S. Appl. No. 13/153,743, dated Mar. 4, 2013.

International Search Report and Written Opinion pertaining to International Patent Application No. PCT/NZ2012/000084, dated Jan. 30, 2013.

Search Report/Written Opinion from PCT/NZ2012/000051 mailed Jan. 2, 2013.

Search Report/Written Opinion from PCT/NZ2012/000091 mailed Oct. 31, 2012.

Search Report/Written Opinion from PCT/US2012/054062 mailed Nov. 27, 2012.

Search Report/Written Opinion from PCT/US2012/052247 mailed Nov. 27, 2012.

Office Action from U.S. Appl. No. 13/159,501 mailed Jan. 10, 2013.
Office Action from U.S. Appl. No. 13/166,600 mailed Dec. 31, 2012.
Office Action from U.S. Appl. No. 12/948,358 mailed Apr. 8, 2013.

* cited by examiner

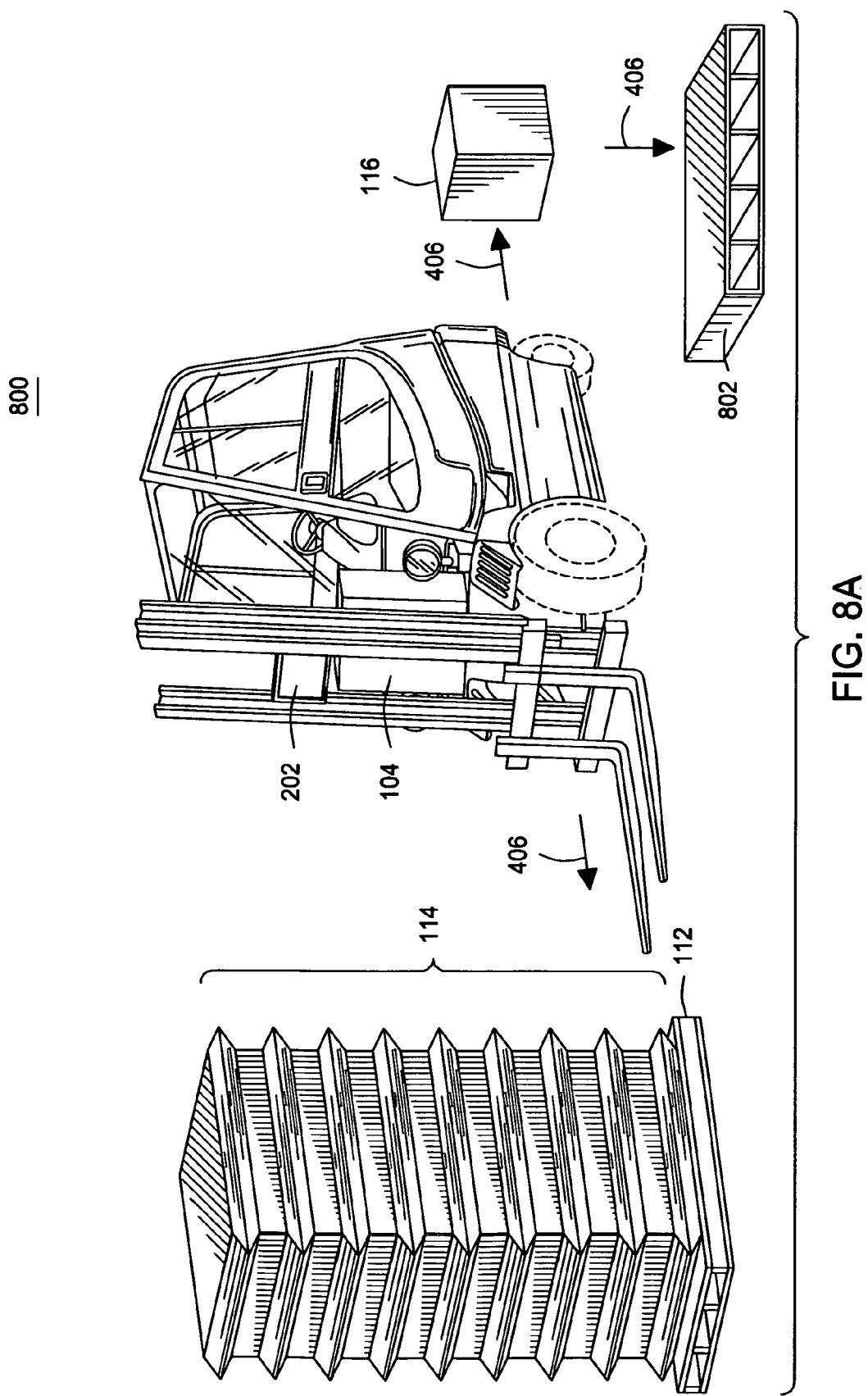

METHOD AND APPARATUS FOR SIMULATING A PHYSICAL ENVIRONMENT TO FACILITATE VEHICLE OPERATION AND TASK COMPLETION

BACKGROUND OF THE INVENTION

1. Field of the Invention

Embodiments of the present invention generally relate to a logistics management systems and, more particularly, to a method and apparatus for simulating a physical environment to facilitate vehicle operation and task completion.

2. Description of the Related Art

Entities regularly operate numerous facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. These tasks include object handling tasks, such as moving pallets of goods to different locations within a warehouse. For example, most warehouses employ a large number of forklift drivers and forklifts to move objects. In order to increase productivity, these warehouses simply add more forklifts and forklift drivers. Some warehouses utilize equipment for automating these tasks. As an example, these warehouses may employ automated forklifts to carry objects on paths. Objects within these warehouses, however, must have a known, consistent size and shape in order to be handled by automatic equipment. In other words, the tasks must be well-defined otherwise the automatic equipment cannot properly execute each and every step of the handling procedure.

In conventional automation solutions, numerous tasks cannot be completed without a modicum of remote intervention. For example, tasks that are not well-defined cannot be completed without a human operator assisting the automatic equipment and/or correcting mistakes. The automatic equipment typically makes mistakes when reading object information or moving irregular objects. The conventional automation solutions, however, cannot provide the human operator with visibility of the entire physical environment. The human operator cannot examine the physical environment from any viewpoint.

Such a limitation is problematic because the viewpoint relative to a real forklift is far from optimal since the mast and loadguard obscure a considerable portion of the field of view. In a physical environment, these obstructions are difficult to remove. Sometimes, human operators must physically lift and move these obstructions. In addition, an automated forklift cannot automatically ascertain if a given route or path is clear of these obstacles. Some solutions rely on indexed fork positions or rulers on a racking side to achieve specific heights. Such solutions are also inaccurate and do not re-route in response to the obstacles.

Therefore, there is a need in the art for a method and apparatus for simulating a physical environment to facilitate vehicle operation and task completion using visual representations from any desired viewpoint.

SUMMARY OF THE INVENTION

Embodiments of the present invention generally include a method and apparatus for simulating a physical environment to facilitate vehicle operation and task completion. In one embodiment, the method includes processing data that is transmitted from a sensor array comprising a plurality of devices, wherein the plurality of devices are placed throughout a physical environment that comprises a plurality of objects, accessing model information associated with the plurality of objects, wherein the model information indicates at least one physical attribute associated with each of the plurality of objects, correlating the model information with the transmitted data from the sensor array to produce a correlation result, generating at least one visual representation of the physical environment from at least one viewpoint based on the correlation result and identifying at least one obstruction, within the physical environment, using the at least one visual representation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 8A-C are visual representations that illustrate various views of a vehicle for facilitating automation of various

DETAILED DESCRIPTION

Various embodiments of the present invention simulate a physical environment by producing a virtual model that illustrates objects of interest within the physical environment. The virtual model enables creation of visual representations of the physical environment from any perspective. For example, one or more software modules may generate real-time video feeds presenting multiple viewpoints from any desired three-dimensional point, such as a view of a vehicle exterior at a certain angle within the physical environment. The video feeds may be actual video recordings of the physical environment. Alternatively, the video feeds may be projected onto a virtual environment where graphical images and/or text are augmented in order to provide additional information regarding the physical environment.

In order to facilitate vehicle operation and task completion in, for example, an industrial environment, these visual representations present one or more human operators with numerous views of the physical environment relative to a vehicle, such as a forklift. These video feeds inform the human operators of pending obstructions that typically frustrate task completion along paths to a destination. The human operators may be located on the vehicle or remotely at a central computer. The one or more software modules remove or rendered translucent any vehicle component that obstructs the view of any objects to be transported. In addition, these visual representations may be augmented with directional indicia for the purpose of moving and guiding the vehicle, as explained further below.

Figure 1:
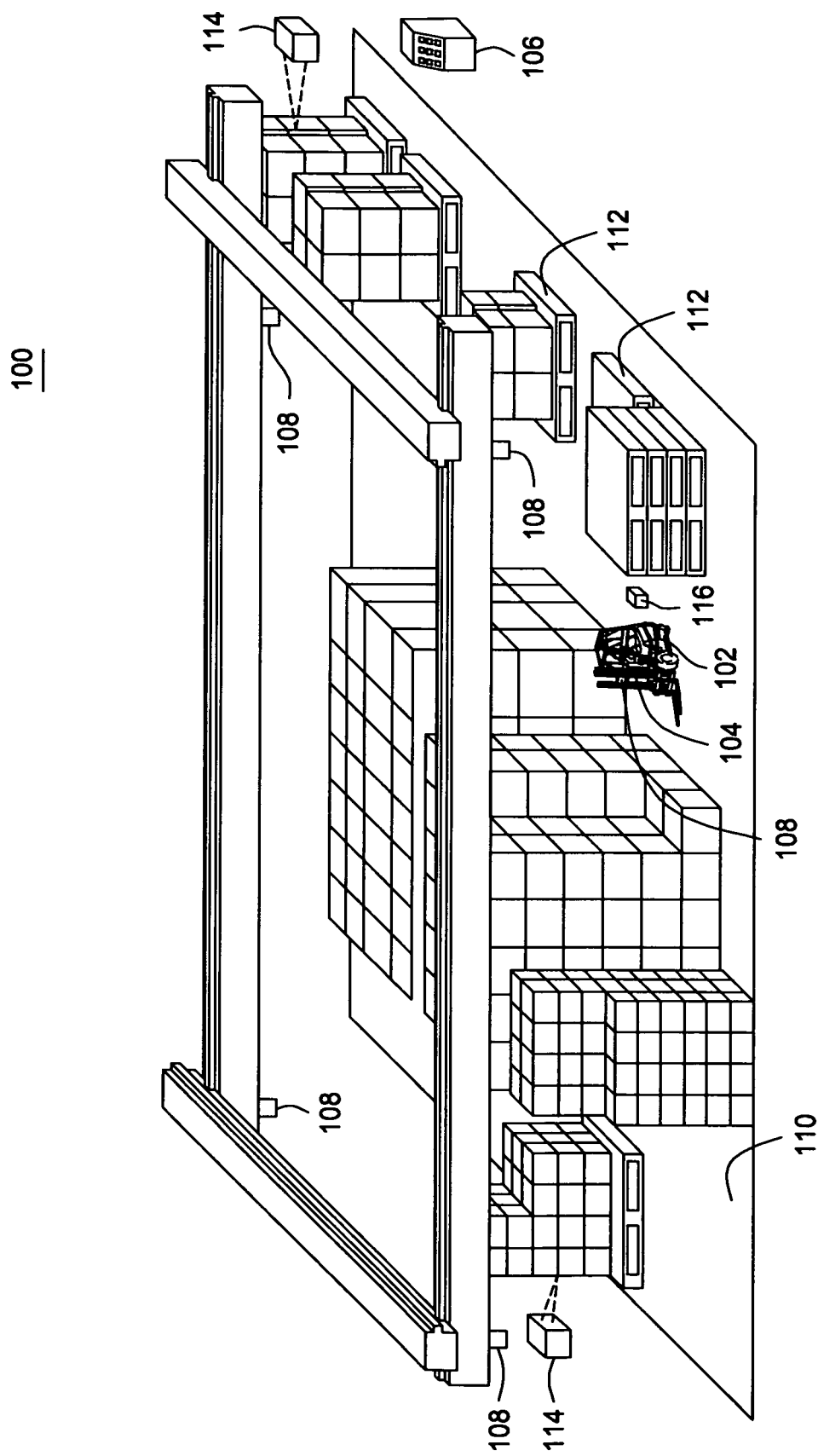
FIG. 1 illustrates a perspective view of a physical environment according to one or more embodiments of the present invention.

FIG. 1 illustrates a schematic, perspective view of a physical environment 100 comprising one or more embodiments of the present invention.

In some embodiments, the physical environment 100 includes a vehicle 102 having a mobile computer 104, a central computer 106 as well as a sensor array 108. The sensor array 108 includes a plurality of devices for analyzing the physical environment 100 and transmitting data (e.g., image data, video data, range map data, three-dimensional graph data and/or the like) to the mobile computer 104 and/or the central computer 106, as explained further below.

The physical environment 100 further includes a floor 110 upon which a plurality of objects occupy. The plurality of objects include a plurality of pallets 112, a plurality of units 114 and/or the like as explained further below. The physical environment 100 also includes various obstructions to the operation of the vehicle 102, such as an obstruction 116. Some of the plurality of objects form obstructions along paths for completing tasks. In addition, a portion of the vehicle 102, such as a lift carriage, may be obstructing a front view of a certain pallet load.

The physical environment 100 may include a warehouse for housing the plurality of units 114 in preparation for future transportation. Warehouses may include loading docks to load and unload the plurality of units from commercial vehicles, railways, airports and/or seaports. The plurality of units 114 generally include various goods, products and/or raw materials and/or the like. The plurality of units 114 may include goods that are usually placed on one or more pallets 112. For example, the plurality of units 114 may be consumer goods that are placed on ISO standard pallets and loaded into pallet racks by forklifts to be distributed to retail stores. The vehicle 102 facilities such a distribution by moving the consumer goods to designated locations where other vehicles (e.g., commercial trucks) load and subsequently deliver the consumer goods to one or more destinations.

According to one or more embodiments, the vehicle 102 may be an automated forklift, which in turn handles and/or moves the plurality of units 114 about the physical environment 100. The vehicle 102 generally lifts one or more units 114 and then, carries these units 114 along a particular path to be placed at a designated location. Alternatively, the one or more units 114 may be arranged on a pallet 112 of which the vehicle 102 lifts and moves to the designated location. The particular path may be pre-defined or dynamically computed as the vehicle 102 performs a task.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of a unit load and permits handling and storage efficiencies. Various ones of the plurality of pallets 112 may be utilized within a rack system (not pictured). Within a typical rack system, gravity rollers or tracks allow one or more units 114 on one or more pallets 112 to flow to the front. The one or more pallets 112 move forward until slowed or stopped by a retarding device, a physical stop or another pallet 112.

In some embodiments, the mobile computer 104 and the central computer 106 are computing devices that control the vehicle 102 and perform various tasks within the physical environment 100. The mobile computer 104 is adapted to couple with the vehicle 102 as illustrated. The mobile computer 104 may also receive and aggregate data that is transmitted by the sensor array 108. In some embodiments, various software modules within the mobile computer 104 and/or the central computer 106 render a virtual model of the plurality of objects within the physical environment 100. Based on the virtual model, these software modules generate visual representations of the physical environment 100 at any selected viewpoint as explained further below.

Figure 2:
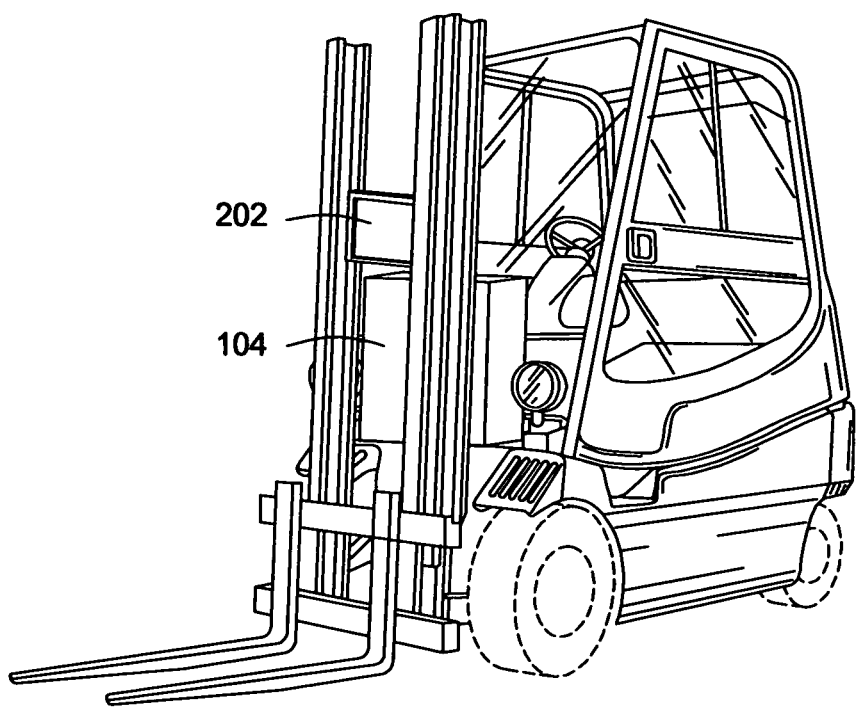
FIG. 2 illustrates a perspective view of a vehicle for facilitating automation of various tasks within a physical environment according to one or more embodiments of the present invention.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The forklift 200 may travel inside a storage bay that is multiple pallet positions deep to place or retrieve a pallet. Oftentimes, the forklift 200 is guided into the storage bay according to a path that is based on real-time a priori knowledge of the storage bay. Once inside, the forklift 200 places the pallet on cantilevered arms or rails. Hence, the dimensions of the forklift 200, including overall width and mast width, must be accurate within a visual representation.

The forklift 200 may be an automated guided vehicle that is coupled with the mobile computer 104, which operates and moves the forklift 200 in accordance with one or more tasks. These tasks may be pre-defined or constructed dynamically based on current conditions within the physical environment. According to various embodiments, a sensor array (e.g., the sensor array 108 of FIG. 1) transmits data (e.g., image data, video data, range map data and/or three-dimensional graph data) to the mobile computer 104, which stores the sensor array data as described in detail further below. The sensor array data may be accessed by a remote computer (e.g., the central computer 106 of FIG. 1) that operates the forklift 200.

In some embodiments, the forklift 200 includes a camera 202 that may be mounted onto any exterior position. For example, the camera 202 may be attached to one or more forks such that video data is captured simulating a view where the operator rides up with the forks. As another example, the camera 202 may be attached to a stationary position behind the forks from which image data and/or video data is recorded depicting a view in front of the forklift 200. The front view may be used to identify obstacles along a path and verify clearance after removal of such obstacles. As yet another example, the camera may be mounted on a right side or left side in order to generate a side view of the physical environment relative to the forklift 200.

Alternatively, the camera 202 may be attached behind the mobile computer 104 to provide a rear view of the physical environment from the forklift 200. The rear view facilitates backwards movement of the forklift where the forks are trailing. Additionally, the rear view is not obscured by the objects being carried on the forks. By providing a clear, unobstructed view, the forklift 200 can safely travel backwards. For example, the rear view enables a human operator to safely traverse down ramps. The visual representation may represent a viewpoint of the physical environment from the rear of the forklift 200 without a human operator physically moving a seat.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanic and/or hydraulic components according to one or more embodiments. In some embodiments, the forklift 200 includes one or more hydraulic components (not labeled) that permit lateral and/or rotational movement of two or more forks. In one embodiment, the forklift 200 includes a hydraulic component (not labeled) for moving the forks together and apart. In another embodiment, the forklift 200 includes a mechanical or hydraulic component for squeezing a unit (e.g., barrels, kegs, paper rolls and/or the like) to be transported. In some embodiments, the forklift 200 includes one or more hydraulic components (not labeled) that clamp or squeeze the forks around one or more units (e.g., cartons, boxes, bales and/or the like) in order to lift these units.

Figure 3:
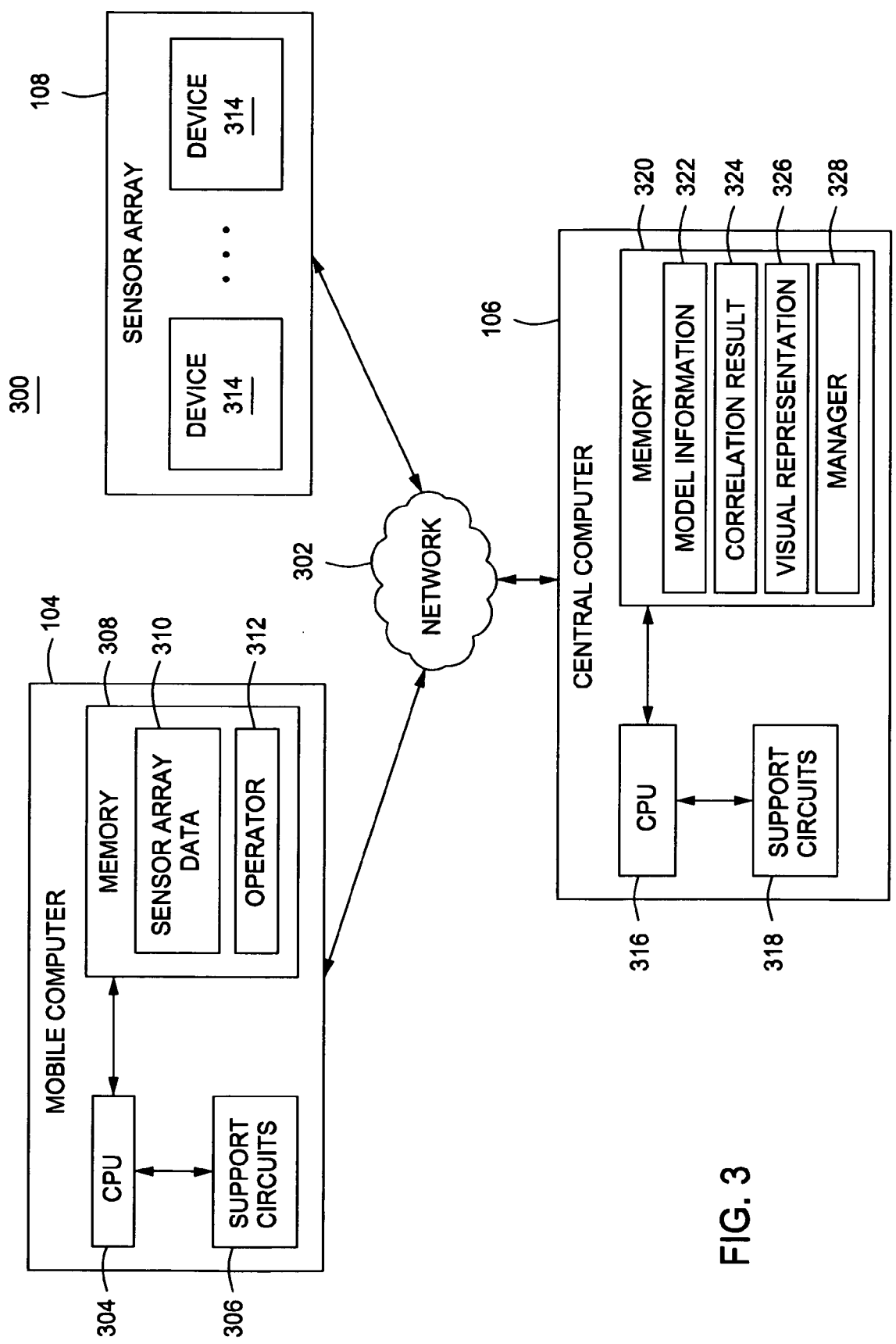
FIG. 3 is a block diagram of a system for simulating a physical environment to facilitate vehicle operation and task completion according to one or more embodiments of the present invention.

FIG. 3 is a block diagram of a system 300 for simulating a physical environment to facilitate vehicle operation and task completion according to one or more embodiments of the present invention. In some embodiments, the system 300 includes the mobile computer 104, the central computer 106 and the sensor array in which each component is coupled to each other through a network 302.

The mobile computer 104 is a type of computing device (e.g., a laptop, a desktop, a Personal Desk Assistant (PDA), a tablet, a mobile phone and the like) that comprises a central processing unit (CPU) 304, various support circuits 306 and a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits and/or the like. The memory 308 includes a read only memory, random access memory, disk drive storage, optical storage, removable storage, and the like. The memory 308 includes various data, such as sensor array data 310. The memory 308 includes various software packages, such as an operator 312.

The central computer 106 is a type of computing device (e.g., a laptop, a desktop, a Personal Desk Assistant (PDA), a tablet, a mobile phone and the like) that comprises a central processing unit (CPU) 316, various support circuits 318 and a memory 320. The CPU 316 may comprise one or more commercially available microprocessors or microcontrollers that facilitate data processing and storage. Various support circuits 318 facilitate operation of the CPU 316 and may include clock circuits, buses, power supplies, input/output circuits and/or the like. The memory 320 includes a read only memory, random access memory, disk drive storage, optical storage, removable storage, and the like. The memory 320 includes various data, such as model information 322, a correlation result 324 and a visual representation 326. The memory 320 includes various software packages, such as a manager 328.

In some embodiments, the model information 322 indicates attributes associated with various types of warehouse structures, such as objects and pallets. The model information 322 may include dimensions (e.g., a size and/or a shape), a type and an ISO standard version associated with a particular pallet, object or rack system. For example, the model information 322 associated with a particular pallet may include a pallet type (e.g., stringer, block and/or the like), a corresponding ISO standard (e.g., the ISO Standard 6780), length/width measurements as well as locations of apertures intended for forklift entry.

The sensor array 108 includes a plurality of devices 314 for monitoring and recording data within a physical environment. In some embodiments, the sensor array 108 may include any combination of one or more laser scanners and/or one or more cameras. The plurality of devices 314 may be distributed throughout the physical environment at fixed positions. The plurality of devices 314 may also be affixed to a vehicle. For example, a camera (e.g., the camera 202 of FIG. 2) may be communicable coupled to the mobile computer 104, which is attached to the vehicle.

In some embodiments, the sensor array data 310 includes an aggregation of data transmitted by the plurality of devices 314. In one embodiment, one or more cameras transmit image data and/or video data of the physical environment from a plurality of viewpoints. By capturing visual details from numerous perspectives, an accurate virtual model of the physical environment may be produced. As a result, objects within the physical environment are viewable from any angle. In another embodiment, one or more scanners (e.g., three-dimensional laser scanners) analyze objects within the physical environment and collect data relating to various physical attributes, such as size and shape.

The collected data can then be used to construct digital, three dimensional models useful for a wide variety of applications. The purpose of a three dimensional scanner is usually to create a point cloud of geometric samples on the surface of the subject. These points can then be used to extrapolate the shape of the subject (a process called reconstruction). Three dimensional scanners have a cone-like field of view. While cameras record color information associated with object surfaces within each and every field of views, three dimensional scanners record distance information about these object surfaces within such field of views.

The data produced by a three dimensional scanner indicates a distance to each point on each object surface at each point. Based on these distances, the mobile computer 104 determines a three dimensional position of the each point in a local coordinate system relative to each three dimensional scanner. The three dimensional point may include linear displacement values (e.g., translational measurements Tx, Ty and Tz). In addition, the mobile computer 104 also determines angular displacement (e.g., rotational measurements Rx, Ry and Rz) with respect to the x, y and z-axes. As such, the object being sensed can be described, with respect to orientation, using six degrees of freedom.

In some embodiments, the three dimensional scanners perform a single scan in order to determine values for the six degrees of freedom. In other embodiments, the three dimensional scanners perform multiple scans from different perspectives in order to determine the linear and angular displacement values on the each and every object surface. Various software modules within the mobile computer 104 normalize the data produced by the multiple scans by aligning the distances along a common reference system. Then, these software modules merge the object surfaces to create a complete model of the objects.

The network 302 comprises a communication system that connects computers by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranet using various communications infrastructure such as Ethernet, WiFi, WiMax, General Packet Radio Service (GPRS), and the like.

In some embodiments, the correlation result 324 includes one or more identified objects, pallets and/or the like within the physical environment. The correlation result 324 may include a virtual model of the physical environment based on the sensor array data 310 and the model information 322 as described further below. The virtual model describes an arrangement of a plurality of objects, such as units and/or pallets, in three-dimensional space. The virtual model also identifies each and every object within the physical environment.

In some embodiments, the visual representation 326 includes graphical images or video depicting a particular viewpoint of the physical environment. In some embodiments, the visual representation 326 illustrates a certain object at a desired perspective. The visual representation 326 is created from the virtual model associated with the physical environment in which a certain object may be examined from any viewpoint. For example, the visual representation 326 depicts a side-view of a pallet load from the forklift perspective. As another example, the visual representation 326 illustrates a view in front of the forklift where the pallet load and/or the forks obstruct such a view. Accordingly, the manager 328 removes or makes translucent these obstructions in order to permit a clearer view of the front of the forklift.

In some embodiments, the manager 328 includes software code (e.g., processor-executable instructions) that is stored in the memory 320 and executed by the CPU 316. The manager 328 may be configured to correlate the model information 322 with the sensor array data 310 to produce a correlation result 324. In some embodiments, the manager 328 examines image data, video data and/or scanned data and identifies one or more objects within the physical environment using the model information 322. In some embodiments, the manager 328 matches physical attributes associated with each and every object with known information associated with various types of objects, pallets, rack systems and/or the like. For example, a pallet having a certain length and width is compared with known pallet dimensions to determine a pallet type. Based on the pallet type, the manager 328 produces a virtual model that may be oriented to illustrate various desired portions of the pallet.

Figure 4:
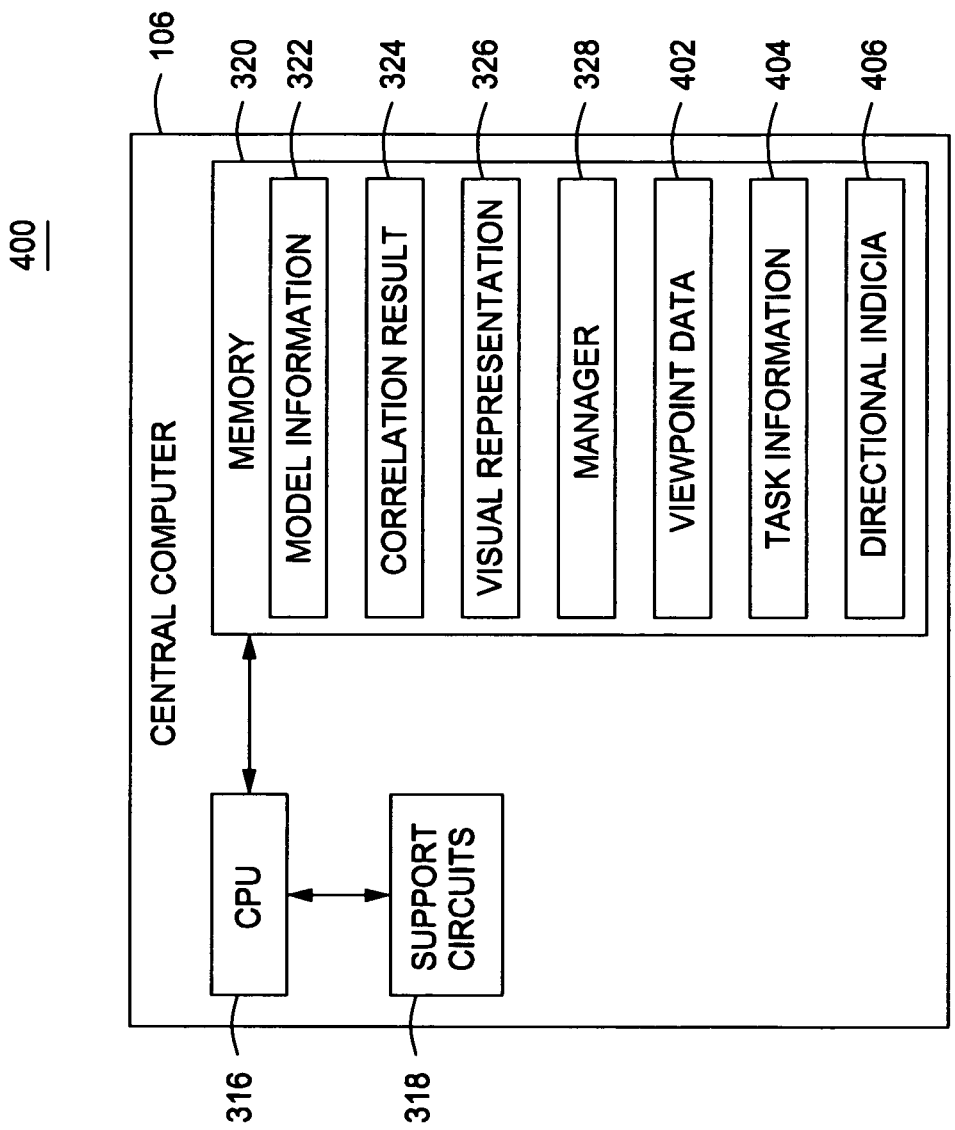
FIG. 4 is a block diagram of a central computer for simulating a physical environment to facilitate vehicle operation and task completion according to one or more embodiments of the present invention.

FIG. 4 is a block diagram of a central computer 106 for simulating a physical environment to facilitate automated vehicle operation and task completion according to one or more embodiments of the present invention.

In some embodiments, the central computer 106 further includes viewpoint data 402, task information 404 and directional indicia 406. Specific viewpoints, such as along the forks, a side view, are stored as the viewpoint data 402. Visual representations 326 at these viewpoints may be displayed in separate multiple windows or on separate monitors. These visual representations 326 may also be displayed in small-windows/icons, which can be selected, using a mouse or touch screen and/or the like, and expanded to occupy an entire screen.

The task information 404 describes one or more tasks that are to be completed within the physical environment. The task information 404 indicates which objects are to be transported for each task. The task information 404 also defines paths for operating a vehicle (e.g., the vehicle 102 of FIG. 1, the forklift 200 of FIG. 2) and performing the one or more tasks. For example, the vehicle may lift a pallet load, move to a designated location along a path, drop the pallet load and then, perform a next task. The paths may include pre-defined routes for transporting the objects to the designated location. Alternatively, the paths may be dynamically adjusted in response to human operator requests or changes to the designated location. The paths are also subject to change based on availability of certain routes.

In some embodiments, the manager 328 couples the task information with the visual representations 326 in order to produce the directional indicia 406. In some embodiments, the manager 328 matches each step of a task with corresponding objects and/or locations within the physical environment. In some embodiments, the manager 328 augments the visual representation 326 with the directional indicia 406. In some embodiments, the visual representation 326 includes highlighted objects and/or arrows for communicating which path is to be traversed for completing the tasks.

Figure 5:
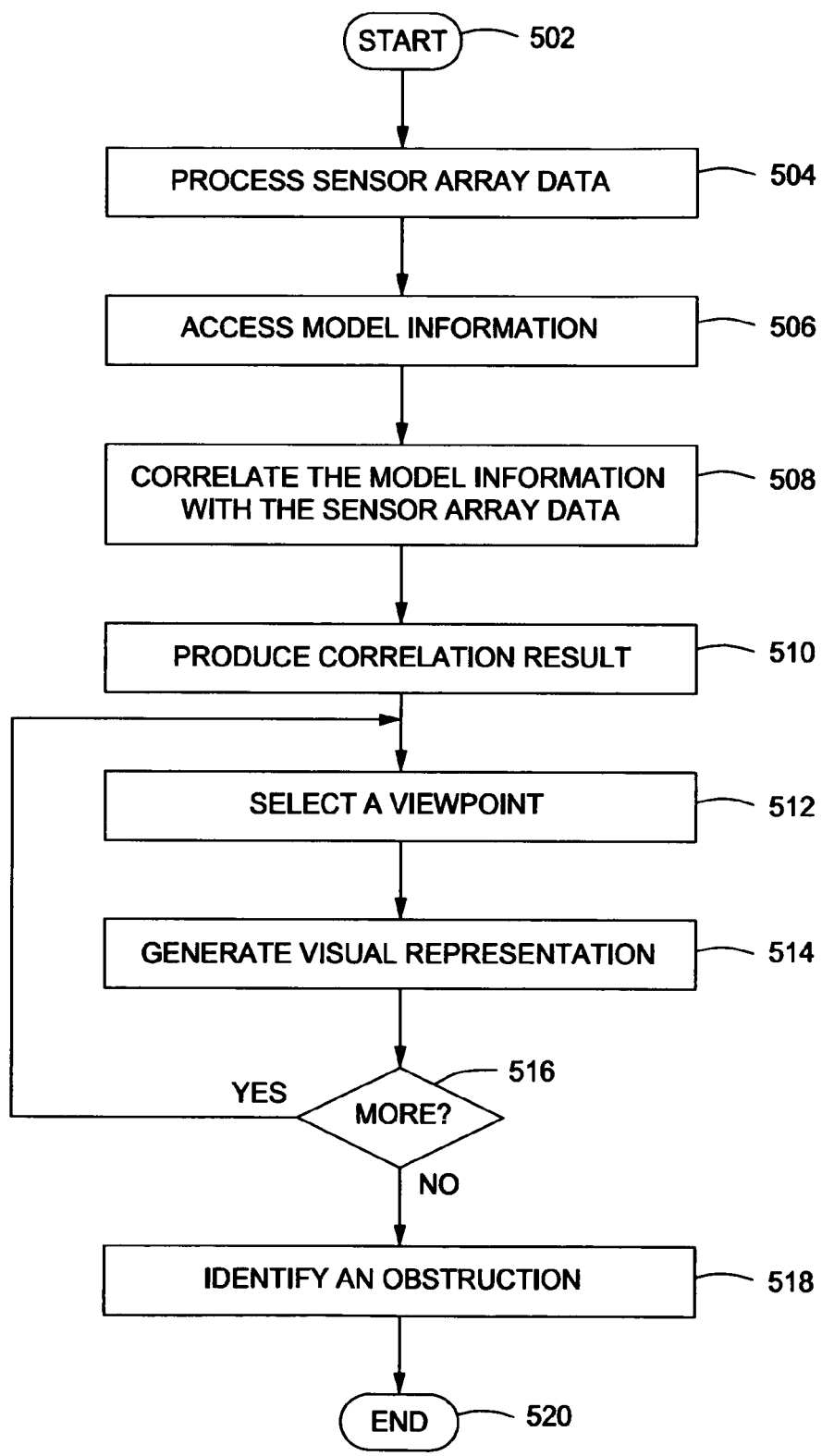
FIG. 5 is a flow diagram of a method for simulating a physical environment to facilitate vehicle operation and task completion according to one or more embodiments of the present invention.

FIG. 5 is a flow diagram of a method 500 for simulating a physical environment to facilitate vehicle operation and task completion according to one or more embodiments of the present invention.

The method 500 starts at step 502 and proceeds to step 504. At step 504, sensor array data is processed. A plurality of devices (e.g., the plurality of devices 314 of FIG. 3) that form a sensor array transmit the sensor array data (e.g., the sensor array data 310 of FIG. 3) to a mobile computer. As described in the present disclosure, the plurality of devices may include one or more cameras and one or more laser scanners. At step 506, model information is accessed. The model information (e.g., the model information 322 of FIG. 3) includes one or more physical attributes associated with each and every type of unit, pallet, rack system and/or the like.

At step 508, the sensor array data is correlated with the model information. A manager (e.g., the manager 328 of FIG. 3) matches each object within the physical environment with a corresponding object type. At step 510, a correlation result is produced. After identifying the each object, the manager creates a virtual model, such as a wire frame model or a video rendering model, of the physical environment based on distances between the objects. The manager stores the virtual model in the correlation result (e.g., the correlation result 324 of FIG. 3). In some embodiments, the manager utilizes one or more software modules (e.g., three-dimensional robot simulator software, such as Gazebo) to define the virtual model and render three-dimensional imagery illustrating the objects and the vehicle within the physical environment.

In some embodiments, the laser scanners determine a distance to each three-dimensional point on a particular object, such as a pallet. Furthermore, the laser scanners determine a distance between every two three-dimensional points. The manager combines these distance measurements with one or more images of the pallet in order to determine a pallet width (e.g., a top deckboard length) and pallet length (e.g., a stringerboard length). Based on a comparison with the model information, the manager identifies a matching pallet model having substantially similar dimensions as the pallet width and the pallet length. Alternatively, the manager may apply various image processing techniques to the pallet images in order identify various features, such as lines, edges, gradients, apertures and/or the like. The manager subsequently compares the various identified features with the model information in order to identify the matching pallet model.

At step 512, a viewpoint is selected. In some embodiments, the manager may select a front, side and/or rear view of the physical environment relative to a forklift. At step 514, a visual representation of the physical environment at the selected viewpoint is generated based on the correlation result. In some embodiments, the manager generates images and/or video depicting the front view, the rear view and/or the side view from the forklift. At step 516, a determination is made as to whether a visual representation at another viewpoint is desired. If the other viewpoint is desired, the method 500 returns to step 512. If, on the other hand, another viewpoint is not desired, the method 500 proceeds to step 518. At step 518, one or more obstructions are identified. At step 520, the method 500 ends.

Figure 6:
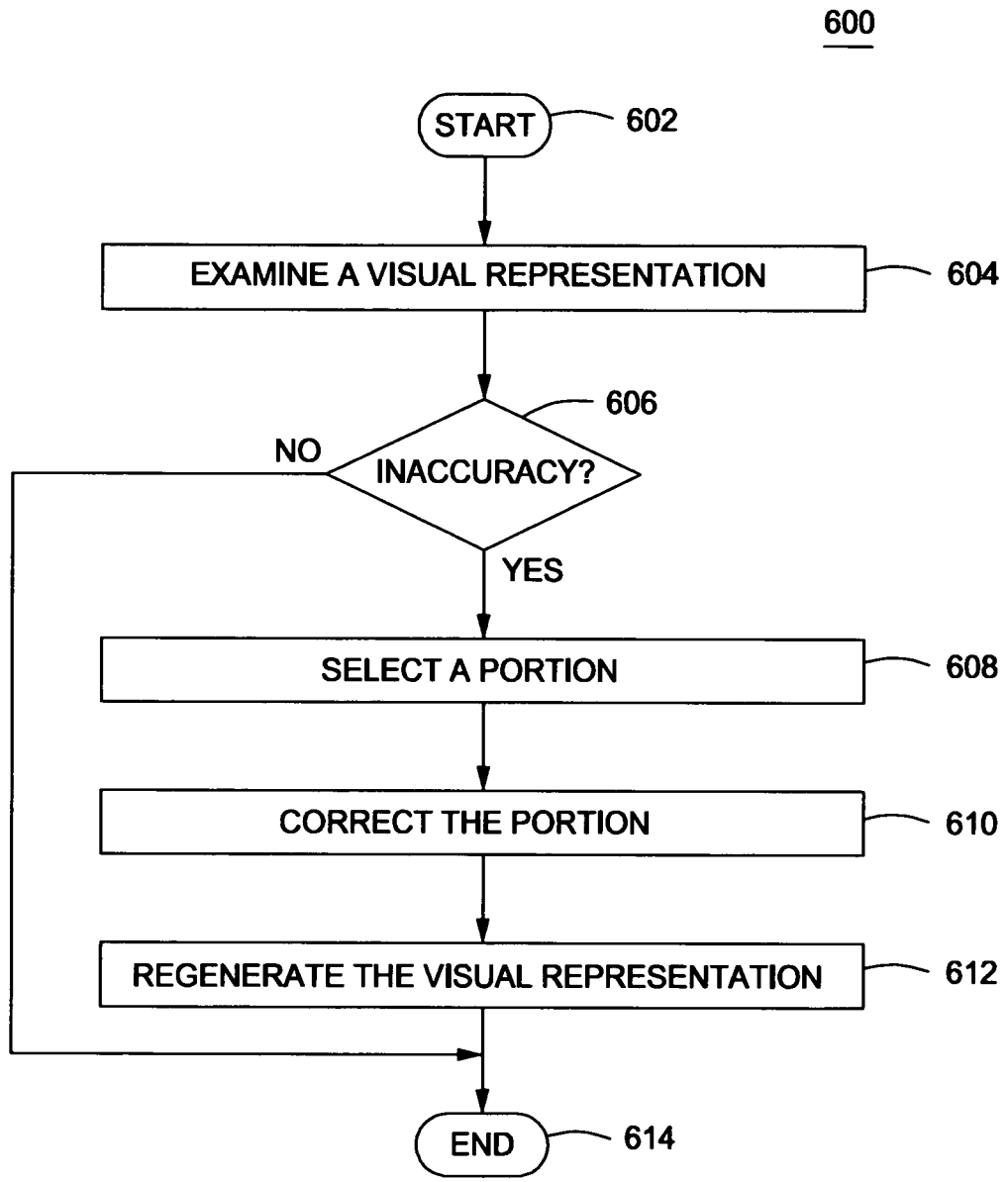
FIG. 6 is a flow diagram of a method for correcting a visual representation of a physical environment according to one or more embodiments of the present invention.

FIG. 6 is a flow diagram of a method 600 for correcting a visual representation of a physical environment according to one or more embodiments of the present invention.

The method 600 starts at step 602 and proceeds to step 604. At step 604, a visual representation of the physical environment is examined. At step 606, a determination is made as to whether the visual representation includes one or more inaccuracies. A device within a sensor array may occasionally fail to correctly detect an object, such as a unit (e.g., the plurality of units 114 of FIG. 1) or a pallet (e.g., the plurality of pallets 112 of FIG. 1). Because of wide variations in facility processes, the physical environment includes numerous slipsheets, malformed units or partially damaged pallets. As a result, many pallets and/or units are inaccurately identified.

If the visual representation is determined to be devoid of any inaccuracies, the method 600 proceeds to step 614. If the visual representation is determined to include one or more inaccuracies, the method 600 proceeds to step 608. At step 608, one or more portions having the one or more inaccuracies are selected. At step 610, the one or more portions are corrected. In some embodiments, one or more objects are incorrectly identified. A manager (e.g., the manager 328 of FIG. 3) may select the one or more portions and correct the one or more inaccurate objects. The manager may remotely complete the virtual model using a wireframe of the pallet. At step 612, the visual representation is regenerated. At step 614, the method 600 ends.

Figure 7:
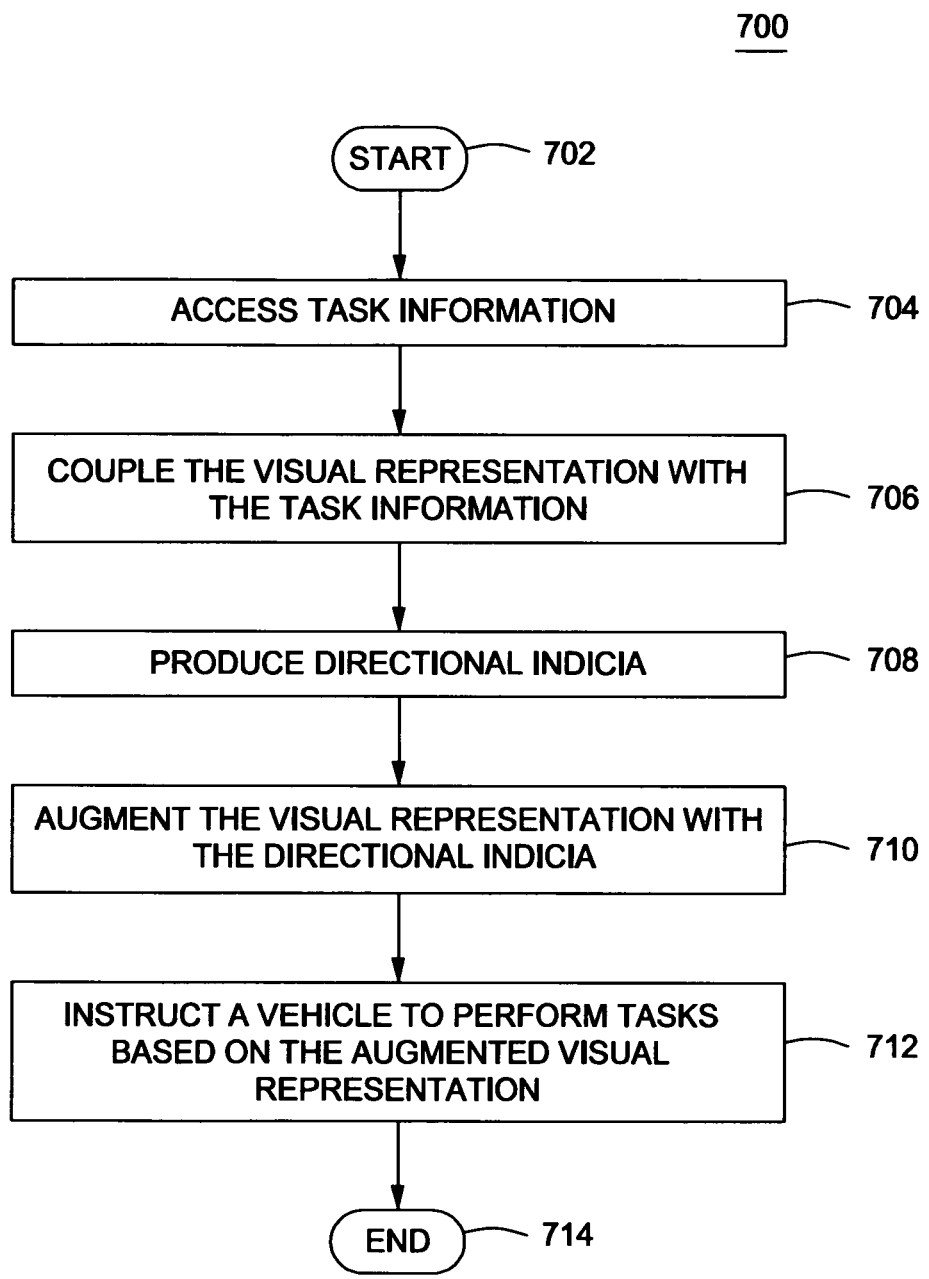
FIG. 7 is a flow diagram of a method for augmenting a visual representation of a physical environment with directional indicia according to one or more embodiments of the present invention.

FIG. 7 is a flow diagram of a method 700 for augmenting a visual representation of a physical environment with directional indicia according to one or more embodiments of the present invention.

The method 700 starts at step 702 and proceeds to step 704. At step 704, task information is accessed. At step 706, the visual representation is coupled with the task information. In some embodiments, a manager (e.g., the manager 328 of FIG. 3) may create a mash-up between the visual representation and one or more paths. At step 708, the directional indicia is produced. At step 710, the visual representation is augmented with the directional indicia. In some embodiments, the manager augments the visual representation with highlighted objects that are to be transported and arrows indicated a path for transported the highlighted objects. At step 712, a vehicle is instructed to perform one or more tasks based on the augmented visual representation. At step 714, the method 700 ends.

FIG. 8A is the visual representation 326 that illustrates a side view 800 of the forklift 200 for facilitating automation of various tasks within a physical environment according to one or more embodiments of the present invention.

In some embodiments, the visual representation 326 is augmented with the directional indicia 406 associated with a particular task. The mobile computer 104 instructs the forklift to perform the particular task along a path as denoted by the directional indicia 406. The directional indicia 406 may be depicted as arrows that follow the path. As mentioned throughout the present disclosure, obstructions often hinder forklift movement and frustrate task completion. As depicted, the obstruction 116 prevents the forklift 200 from moving backwards while carrying a load and eventually reaching a destination 802. By examining the visual representation 326, various software modules, such as a manager (e,g, the manager 328), identify the obstruction 116 and alert any human operators.

Figure 8B:
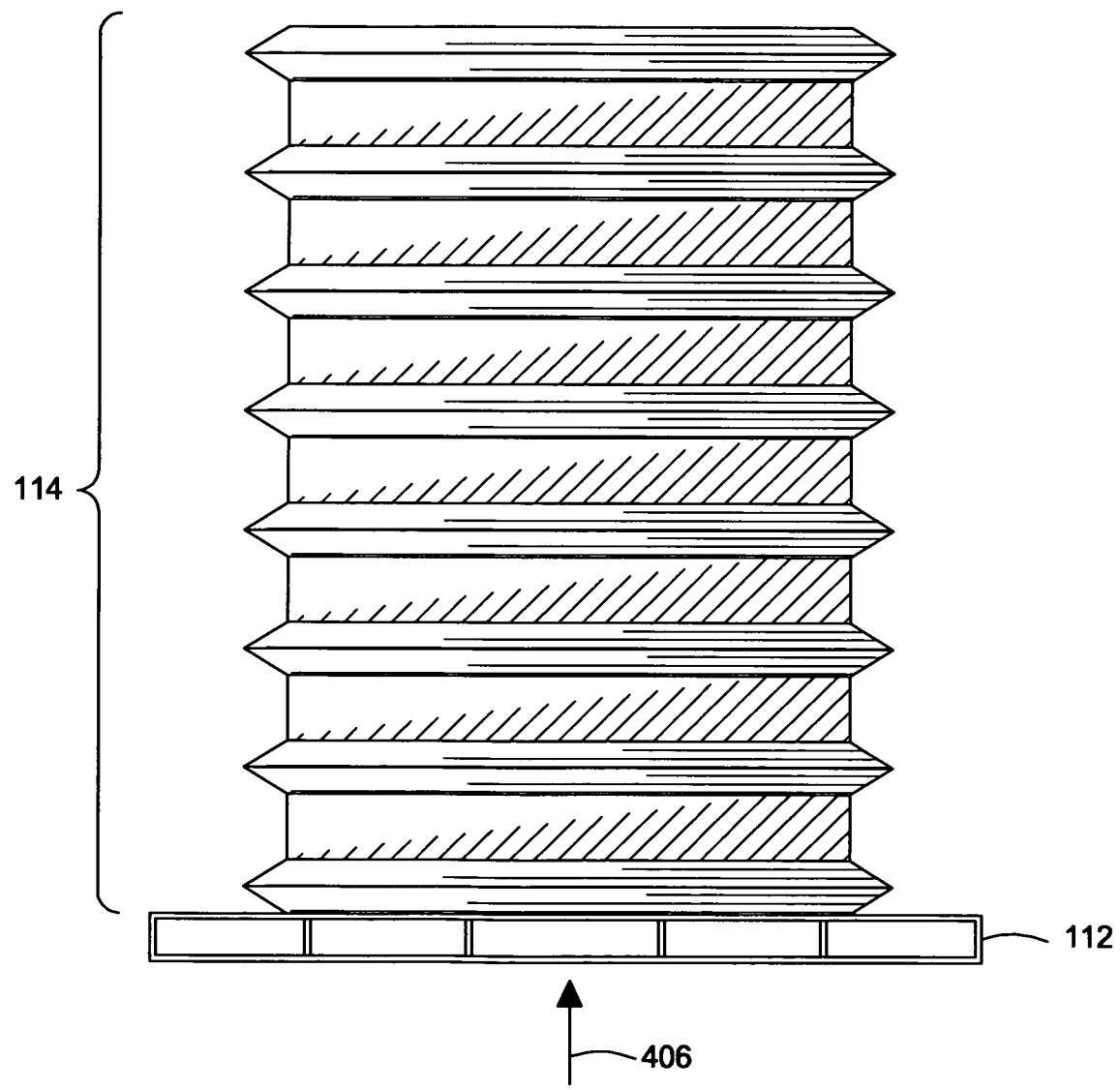

FIG. 8B is the visual representation 326 that illustrates a front view relative to the forklift 200 for facilitating automation of various tasks within a physical environment according to one or more embodiments of the present invention.

In some embodiments, the visual representation 326 includes a live video feed showing one or more objects that are located in the front of the forklift 200. For example, the live video feed illustrates a pallet pick face into which the forklift inserts two or more forks for lifting a load having the units 114. The live video feed may also include one or more obstructions that are rendered translucent and/or removed altogether. For example, a lift carriage may obstruct the front view 804 of the load. Various software modules, such as the manager, may replace the lift carriage with three-dimensional imagery depicting a model of the pallet 112 and the units 114. The live video feed may be displayed on the mobile computer 104 and/or a central computer (e.g., the central computer 106 of FIG. 1).

Figure 8C:
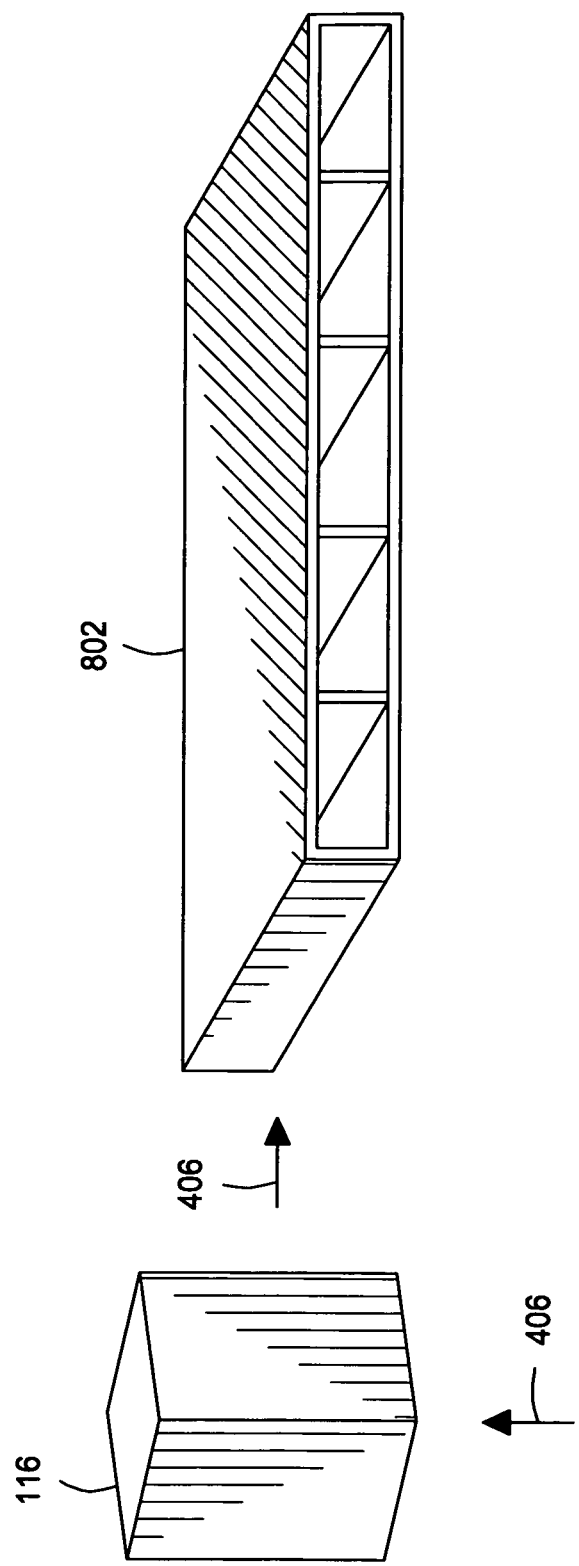

FIG. 8C is the visual representation 326 that illustrates a rear view relative to the forklift 200 for facilitating automation of various tasks within a physical environment according to one or more embodiments of the present invention.

In some embodiments, the visual representation 326 includes a live video feed showing one or more objects that are located in the rear of the forklift 200. Some of these objects may obstruct the movement of the forklift 200 along a path within the physical environment. As explained further below, various software modules examine the visual representation and identify one or more obstructions within the physical environments that disrupt the completion of the particular task, such as the obstruction 116.

While the foregoing is directed to embodiments of the present invention, other and further embodiments of the invention may be devised without departing from the basic scope thereof, and the scope thereof is determined by the claims that follow.

The invention claimed is:

1. A method of operating a vehicle by simulating a physical environment, the method comprising:
collecting data from a sensor array, wherein the collected data relates to various physical attributes, including size and shape, of objects within the physical environment;
using the collected data to construct digital, three-dimensional models of the objects within the physical environment;
accessing the three-dimensional models associated with respective ones of the plurality of objects, wherein the three-dimensional models enable creation of visual representations of respective ones of the plurality of objects from any perspective;
correlating the three-dimensional models with the transmitted data from the sensor array to produce a correlation result;
generating at least one visual representation of the physical environment from at least one viewpoint based on the correlation of the three-dimensional models with the transmitted data from the sensor array;
identifying at least one obstruction represented by the three-dimensional models, within the physical environment, using the at least one visual representation generated based on the correlation of the three-dimensional models with the transmitted data from the sensor array; and
operating the vehicle to complete a task based on the obstruction identified using the visual representation generated based on the correlation of the three-dimensional models with the transmitted data from the sensor array.

2. The method of claim 1, wherein the vehicle is operated by transporting objects along defined paths and the identified obstruction is used to change one of the defined paths.

3. The method of claim 1, wherein:
the visual representation of the physical environment illustrates an obstructed view of the physical environment that is obstructed by the obstruction; and
the method comprises operating the vehicle by removing or making transparent the obstruction in the visual representation of the physical environment.

4. The method of claim 3, wherein the visual representation of the physical environment, with the obstruction removed or made transparent, is displayed on a mobile computer attached to the vehicle, to a central computer coupled to the sensor array through a network, or both.

5. The method of claim 3, wherein:
the task comprises transporting a pallet load; and
the obstruction removed or made transparent is the transported pallet load.

6. The method of claim 3, wherein:
the vehicle comprises a forklift;
the task comprises moving the forklift along a defined path; and
the obstruction removed or made transparent is selected from a lift carriage, forks, lifting poles of the forklift, or combinations thereof.

7. The method of claim 1, wherein data transmitted from the sensor array comprises data relating to various physical attributes associated with each of the plurality of objects.

8. The method of claim 1, wherein the vehicle comprises a mobile computer and the method comprises:

storing the data transmitted from the sensor array on the mobile computer;
utilizing the mobile computer to instruct the vehicle to complete the task.

9. The method of claim 8, wherein the visual representation of the physical environment is displayed on the mobile computer.

10. The method of claim 1, wherein:
the vehicle comprises a mobile computer attached to the vehicle;
the mobile computer is coupled to the sensor array and a central computer through a network; and
the method comprises displaying the visual representation of the physical environment on the central computer.

11. The method of claim 1, wherein:
the vehicle comprises a mobile computer attached to the vehicle;
the mobile computer is coupled to the sensor array and a central computer through a network; and
the method comprises using software modules within the mobile computer, the central computer, or both, to render the three-dimensional model of the plurality of objects within the physical environment and generate visual representations of the physical environment at any selected viewpoint.

12. The method of claim 1, wherein the visual representation of the physical environment is generated by further steps comprising:
selecting a viewpoint of the at least one viewpoint;
generating a visual representation from the selected viewpoint of the at least one visual representation;
selecting another viewpoint of the at least one viewpoint; and
generating another visual representation of the physical environment from the other selected viewpoint of the at least one visual representation of the physical environment.

13. The method of claim 1, wherein:
the collected data comprises a point cloud of geometric samples on a surface of an object within the physical environment; and,
the method comprises extrapolating object shape from the point cloud.

14. The method of claim 1, wherein:
data from the sensor array is collected from multiple scans of an object within the physical environment from different perspectives in order to determine linear and angular displacement values on surface of the object;
object surface data produced from the multiple scans is normalized along a common reference system; and
the three-dimensional models are constructed by merging the normalized object surface data produced from the multiple scans.

15. The method of claim 1, wherein:
data from the sensor array is collected from multiple scans of an object within the physical environment from different perspectives; and
the three-dimensional models are constructed by merging the object surface data produced from the multiple scans.

16. A system for simulating a physical environment to facilitate vehicle operation and task completion, the system comprising a mobile computer coupled to a vehicle, a central computer, and a sensor array, wherein:
the mobile computer, the central computer, and the sensor array are coupled to each other through a network; and software modules within the central computer, the mobile computer, or both, render three-dimensional models of a plurality of objects within a physical environment in which the vehicle operates and, based on the three-dimensional models, generate visual representations of the physical environment at any selected viewpoint to facilitate vehicle operation by collecting data from a sensor array, wherein the collected data relates to various physical attributes, including size and shape, of objects within the physical environment, using the collected data to construct digital, three-dimensional models of the objects within the physical environment, accessing the three-dimensional models associated with respective ones of the plurality of objects, wherein the three-dimensional models enable creation of visual representations of respective ones of the plurality of objects from any perspective, correlating the three-dimensional models with the transmitted data from the sensor array to produce a correlation result, generating at least one visual representation of the physical environment from at least one viewpoint based on the correlation of the three-dimensional models with the transmitted data from the sensor array, identifying at least one obstruction represented by the three-dimensional models, within the physical environment, using the at least one visual representation generated based on the correlation of the three-dimensional models with the transmitted data from the sensor array, and operating the vehicle to complete a task based on the obstruction.

17. The system of claim 16, wherein the sensor array is fixed to the vehicle.

18. The system of claim 16, wherein the sensor array is distributed throughout the physical environment at fixed positions.

* * * * *